US011333638B2

(12) United States Patent
Kojima

(10) Patent No.: US 11,333,638 B2
(45) Date of Patent: May 17, 2022

(54) GAS CHROMATOGRAPH

(71) Applicant: SHIMADZU CORPORATION, Kyoto (JP)

(72) Inventor: Masahiro Kojima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 479 days.

(21) Appl. No.: 16/330,908

(22) PCT Filed: Sep. 8, 2016

(86) PCT No.: PCT/JP2016/076517
§ 371 (c)(1),
(2) Date: Mar. 6, 2019

(87) PCT Pub. No.: WO2018/047279
PCT Pub. Date: Mar. 15, 2018

(65) Prior Publication Data
US 2019/0234913 A1  Aug. 1, 2019

(51) Int. Cl.
*G01N 30/32*   (2006.01)
*G01N 30/86*   (2006.01)
(Continued)

(52) U.S. Cl.
CPC ............ *G01N 30/32* (2013.01); *G01N 30/02* (2013.01); *G01N 30/82* (2013.01); *G01N 30/86* (2013.01); *G01N 2030/324* (2013.01)

(58) Field of Classification Search
CPC ........ G01N 30/32; G01N 30/86; G01N 30/02; G01N 30/82; G01N 2030/324; G01N 30/78; G01N 2030/8804
(Continued)

(56) References Cited

U.S. PATENT DOCUMENTS 5,108,466 A  *  4/1992  Klein ................... G01N 30/32
                                                        95/1
5,550,539 A  *  8/1996  Miki ..................... G06F 11/20
                                                        341/20
(Continued)

FOREIGN PATENT DOCUMENTS

JP      61 -74865 U      5/1986
JP      05-005729 A      1/1993
(Continued)

OTHER PUBLICATIONS

Notice of Reasons for Refusal dated Nov. 19, 2019 from the Japanese Patent Office in application Machine No. 2018-537936.
(Continued)

*Primary Examiner* — Marrit Eyassu
(74) *Attorney, Agent, or Firm* — Sughrue Mion, PLLC

(57) ABSTRACT

A main controller 201 of a main substrate 20 performs serial communications with a sub controller 214 of each flowrate control substrate 21. The flowrate of the carrier gas is controlled with the flowrate control circuit 213 under the control performed by each sub controller 214. Thus, the main controller 201 only needs to execute the processing of performing the serial communications with each sub controller 214. As a result, the processing executed by the main controller 201 can be reduced, and the processing executed by the main controller 201 is less likely to overwhelm its processing capability even when the number of flowrate control substrates 21 is increased. In addition, a signal line 40 between the main controller 201 and each sub controller 214 can be made long. Thus, the distance between the main substrate 20 and each of the flowrate control substrates 21 can be made long.

6 Claims, 5 Drawing Sheets

(51) Int. Cl.
*G01N 30/02* (2006.01)
*G01N 30/82* (2006.01)

(58) Field of Classification Search
USPC .................................................... 73/23.42
See application file for complete search history.

(56) References Cited

U.S. PATENT DOCUMENTS

| | | | |
|---|---|---|---|
| 6,377,363 B1* | 4/2002 | Ito | G06K 15/00 |
| | | | 355/40 |
| 2003/0177343 A1* | 9/2003 | Magoshi | G06F 9/3885 |
| | | | 712/241 |
| 2005/0109079 A1 | 5/2005 | Furukawa | |
| 2007/0144977 A1 | 6/2007 | Kitagawa | |
| 2015/0059626 A1* | 3/2015 | Conrad | A01M 7/0092 |
| | | | 111/120 |

FOREIGN PATENT DOCUMENTS

| | | | |
|---|---|---|---|
| JP | 07-270388 A | | 10/1995 |
| JP | 07270388 A | * | 10/1995 |
| JP | 10-132825 A | | 5/1998 |
| JP | 2007-171034 A | | 7/2007 |
| JP | 2011017606 A | | 1/2011 |
| JP | 2016080466 A | * | 10/2014 |
| JP | 2016-057148 A | | 4/2016 |
| JP | 2016080466 A | | 5/2016 |

OTHER PUBLICATIONS

International Search Report of PCT/JP2016/076517 dated Dec. 13, 2016 [PCT/ISA/210].
Written Opinion of PCT/JP2016/076517 dated Dec. 13, 2016 [PCT/ISA/237].
Office Action dated Jan. 4, 2022 in Chinese Application No. 201680089088.6.

* cited by examiner

GAS CHROMATOGRAPH

CROSS REFERENCE TO RELATED APPLICATIONS

This application is a National Stage of International Application No. PCT/JP2016/076517, filed Sep. 8, 2016, the contents of which are incorporated herein by reference in its entirety.

TECHNICAL FIELD

The present invention relates to a gas chromatograph including a main substrate and a plurality of flowrate control substrates connected to the main substrate.

BACKGROUND ART

In gas chromatographs, carrier gas and sample gas are supplied from a sample introduction section into a column, and sample components are separated, in a process where the carrier gas passes through the column, to be detected by a detector. In the gas chromatograph, the carrier gas has a flowrate controlled to flow at a constant rate (see, for example, PTL 1).

A known gas chromatograph of this type includes components such as a sample introduction section, a columns, and a detector each provided in plurality. In this gas chromatograph, each of the flowrates of carrier gas introduced into the respective columns is controlled.

FIG. 5 is a block diagram illustrating an electrical configuration of a main substrate 110, flowrate control substrates 120, and peripheral members of these, in a conventional gas chromatograph 100.

The gas chromatograph 100 includes the main substrate 110 and two flowrate control substrates 120.

The main substrate 110 includes a controller 111. For example, the controller 111 is a component including a central processing unit (CPU).

Each of the flowrate control substrates 120 includes a flowrate detection circuit 121, a pressure detection circuit 122, and a flowrate control circuit 123. In the gas chromatograph 100, flow paths (gas supply flow paths) through which the carrier gas is introduced into the respective columns are each provided with a flowrate sensor 124, a pressure sensor 125, and a full flow valve 126. The gas chromatograph 100 has split flow paths each provided with a split valve 127. The gas chromatograph 100 has purge flow paths each provided with a purge valve 128.

In the gas chromatograph 100, when an analysis operation starts, detection signals from each of the flowrate detection circuits 121 and each of the pressure detection circuits 122 are input to the controller 111 of the main substrate 110, based on detection results obtained by each of the flowrate sensors 124 and each of the pressure sensors 125. The controller 111 of the main substrate 110 causes the flowrate control circuit 123 of each of the flowrate control substrates 120 to control operations of the valves (the full flow valve 126, the split valve 127, and the purge valve 128) based on the detection signal. Thus, the flowrate of the carrier gas flowing in the gas chromatograph 100 is controlled.

PRIOR ART DOCUMENT

Patent Document

Patent Document 1: JP 2016-57148 A

SUMMARY OF THE INVENTION

Problems to be Solved by the Invention

In the conventional gas chromatograph 100 described above, the number of flowrate control substrates 120 that can be installed has been limited. Specifically, the gas chromatograph 100 employs a configuration in which the controller 111 directly controls the flowrate of the carrier gas, meaning that a larger number of flowrate control substrates 120 leads to a larger process load on the controller 111. Furthermore, the controller 111 is in charge of other kinds of control in the gas chromatograph 100. Thus, a configuration in which a predetermined number of flowrate control substrates 120 or more are installed results in the controller 111 executing processing overwhelming its processing capacity. In particular, if the flowrate control substrates 120 are advanced flow controller (AFC) substrates requiring the controller 111 to execute complex processing, no more than two flowrate control substrates 120 have been able to be installed.

Furthermore, there has been another disadvantage in that the length of signal lines 130, for transmitting control signals from the controller 111 to the flowrate control circuits 123, are limited within a certain length due to the fact that the control signals are signals for controlling a plurality of valves in parallel. Thus, the distance between the main substrate 110 and each of the flowrate control substrates 120 is limited within a certain distance.

The present invention is made in view of the above, and an object of the present invention is to provide a gas chromatograph in which a larger number of flowrate control substrates can be installed. Another object of the present invention is to provide a gas chromatograph in which a distance between the main substrate and each flowrate control substrate can be made long.

Means for Solving the Problems (1) A gas chromatograph according to the present invention is a gas chromatograph including a main substrate and a plurality of flowrate control substrates connected to the main substrate. The main substrate includes a main controller. The plurality of flowrate control substrates each include a sub controller that performs serial communications with the main controller, a detection circuit that detects at least a pressure or a flowrate of carrier gas, and a flowrate control circuit that controls the flowrate of the carrier gas based on a detection signal from the detection circuit.

With this configuration, the main controller of the main substrate performs serial communications with the sub controller of each of the flowrate control substrates. The flowrate of the carrier gas is controlled in the flowrate control circuit under the control performed by the sub controller of each of the flowrate control substrates.

Thus, the main controller of the main substrate only needs to execute the processing of performing the serial communications with the sub controller of each of the flowrate control substrates. Thus, the processing executed by the main controller can be reduced.

As a result, the processing executed by the main controller is less likely to overwhelm its processing capability even when the number of flowrate control substrates is increased. Thus, a larger number of flowrate control substrates can be installed in the gas chromatograph.

The main controller and each sub controller perform the serial communications, whereby a signal line between the main controller and each sub controller can be made long.

Thus, the distance between the main substrate and each of the flowrate control substrates can be made long.

(2) In the present embodiment, the main controller may transmit a control target value, for the flowrate control circuits to control the flowrate of the carrier gas, to sub controllers, through the serial communications.

With this configuration, the main controller only needs to execute simple processing of transmitting the control target value to each sub controller through the serial communications.

(3) The main controller may transmit the control target value sequentially to the sub controllers of the plurality of flowrate control substrates through the serial communications at a predetermined interval.

With this configuration, the main controller can smoothly transmit the control target value to the sub controllers. Furthermore, the control interval in each sub controller can be made short.

(4) The sub controller may cause the flowrate control circuit to stop the carrier gas upon failing to receive the control target value.

With this configuration, the carrier gas can be prevented from flowing when the main controller has failure.

(5) The main controller may include a power supply controller. The power supply controller controls power supply to each of the plurality of flowrate control substrates.

With this configuration, with the power supply controller performing control to stop the power supply to each flowrate control substrate, the carrier gas can be certainly stopped.

(6) The main controller may include a control value reception section. The control value reception section receives a control value from each of the sub controllers of the plurality of flowrate control substrates. The power supply controller stops the power supply to a flowrate control substrate, out of the plurality of flowrate control substrates, the control value from which has been failed to be received by the control value reception section.

With this configuration, the power supply controller can certainly stop the power supply to the flowrate control substrate that has failure.

Effects of the Invention

According to the present invention, the main controller of the main substrate only needs to execute the processing of performing the serial communications with the sub controller of each of the flowrate control substrates. Thus, the processing executed by the main controller can be reduced. As a result, the processing executed by the main controller is less likely to overwhelm its processing capability even when the number of flowrate control substrates is increased. Thus, a larger number of flowrate control substrates can be installed in the gas chromatograph. The main controller and each sub controller perform the serial communications, whereby a signal line between the main controller and each sub controller can be made long. Thus, the distance between the main substrate and each of the flowrate control substrates can be made long.

MODE FOR CARRYING OUT THE INVENTION

1. Overall Configuration of Gas Chromatograph

Figure 1:
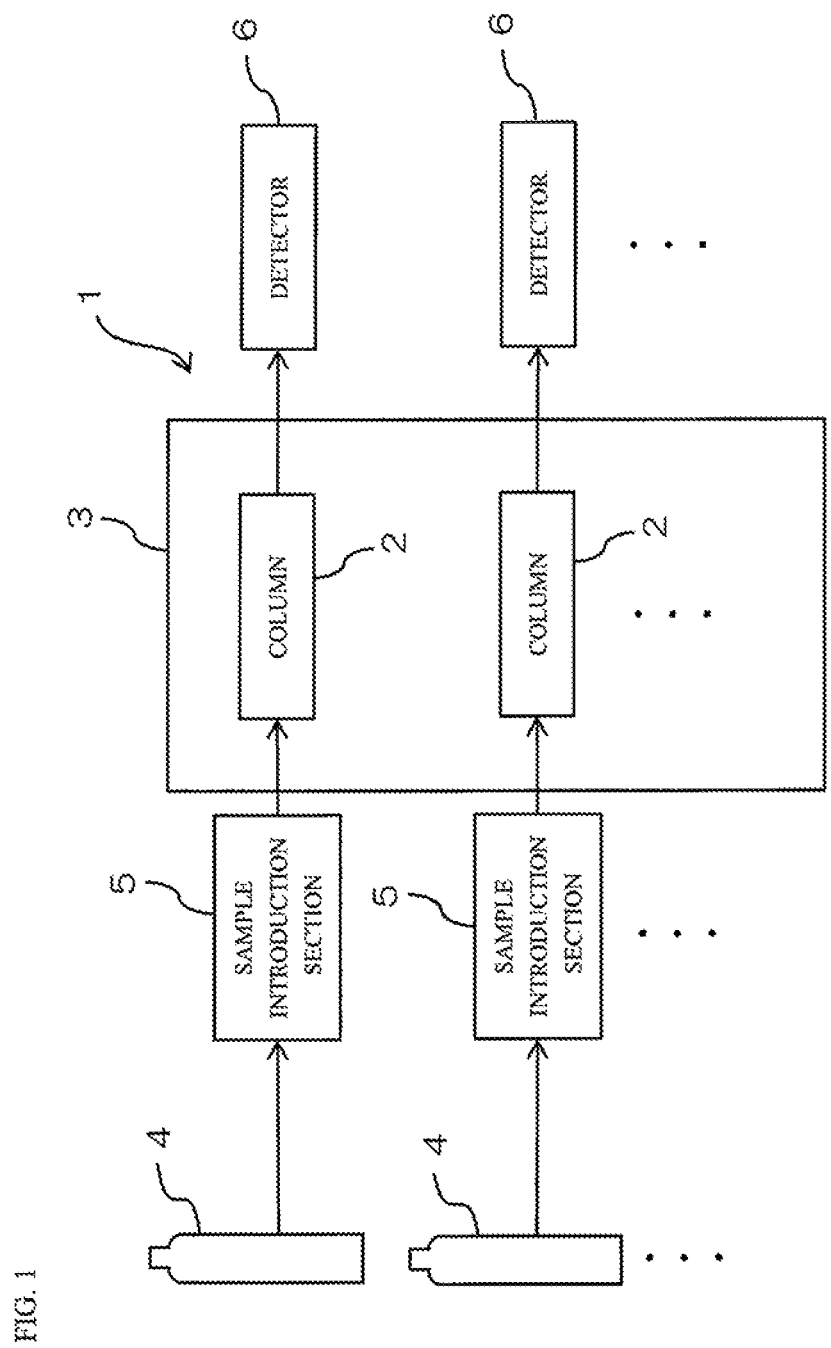
FIG. 1 is a schematic view illustrating a configuration of a gas chromatograph according to one embodiment of the present invention.

FIG. 1 is a schematic view illustrating a configuration of a gas chromatograph according to one embodiment of the present invention.

The gas chromatograph 1 is for analyzing sample components separated in a plurality of columns 2, as a result of introducing a sample into each of the plurality of columns 2 together with carrier gas. In addition to the columns 2, the gas chromatograph 1 includes a column oven 3, a storage section 4, a sample introduction section 5, and a detector 6. The components (the column 2, the storage section 4, the sample introduction section 5, and the detector 6) of the gas chromatograph 1, except for the column oven 3, are each provided in plurality.

The columns 2, each including a capillary column for example, are accommodated in the column oven 3. Thus, in the gas chromatograph 1, a plurality of columns 2 are accommodated in a single column oven 3.

The storage sections 4 store the carrier gas used in the gas chromatograph 1.

The sample introduction sections 5 are for introducing the carrier gas and sample gas into the columns 2, and have sample vaporizing chambers (not illustrated) formed therein. Each of the sample vaporizing chambers is in communication with a gas supply flow path, a split flow path, and a purge flow path (not illustrated). The gas supply flow path is a flow path for supplying the carrier gas into the vaporizing chamber. The split flow path is a flow path through which gas (mixture gas of the carrier gas and the sample gas) in the sample vaporizing chamber is partially discharged to the outside at a predetermined split ratio, when the carrier gas and the sample gas are introduced into the columns 2 by split introduction or the other like methods. The purge flow path is a flow path for discharging unwanted components produced from a septum and the like to the outside.

Examples of the detectors 6 include a flame ionization detector (FID), a thermal conductivity detector (TCD), an electron capture detector (ECD), a flame photometric detector (FPD), or the like. The detectors 6 sequentially detect sample components included in the carrier gas introduced from the columns 2.

To analyze a sample in the gas chromatograph 1, the sample to be analyzed is injected into the sample introduction sections 5. The sample is vaporized in the sample vaporizing chamber. The carrier gas is supplied to the sample vaporizing chamber of the sample introduction section 5 from the storage section 4.

The sample vaporized in the sample vaporizing chamber is introduced into the column 2 together with the carrier gas. The sample components included in the sample are separated in a process of passing through the column 2, to be sequentially introduced into the detectors 6.

Then, the detectors 6 sequentially detect the sample components included in the carrier gas introduced from the columns 2.

The components (the columns 2, the storage sections 4, the sample introduction sections 5, and the detectors 6) of the gas chromatograph 1, except for the column oven 3, are each provided in plurality. Thus, in the gas chromatograph 1, a plurality of flows of carrier gas from the storage sections 4 toward the detectors 6 are formed. In the gas chromatograph 1, as described later, the flowrates of these flows of carrier gas are individually controlled.

Figure 2:
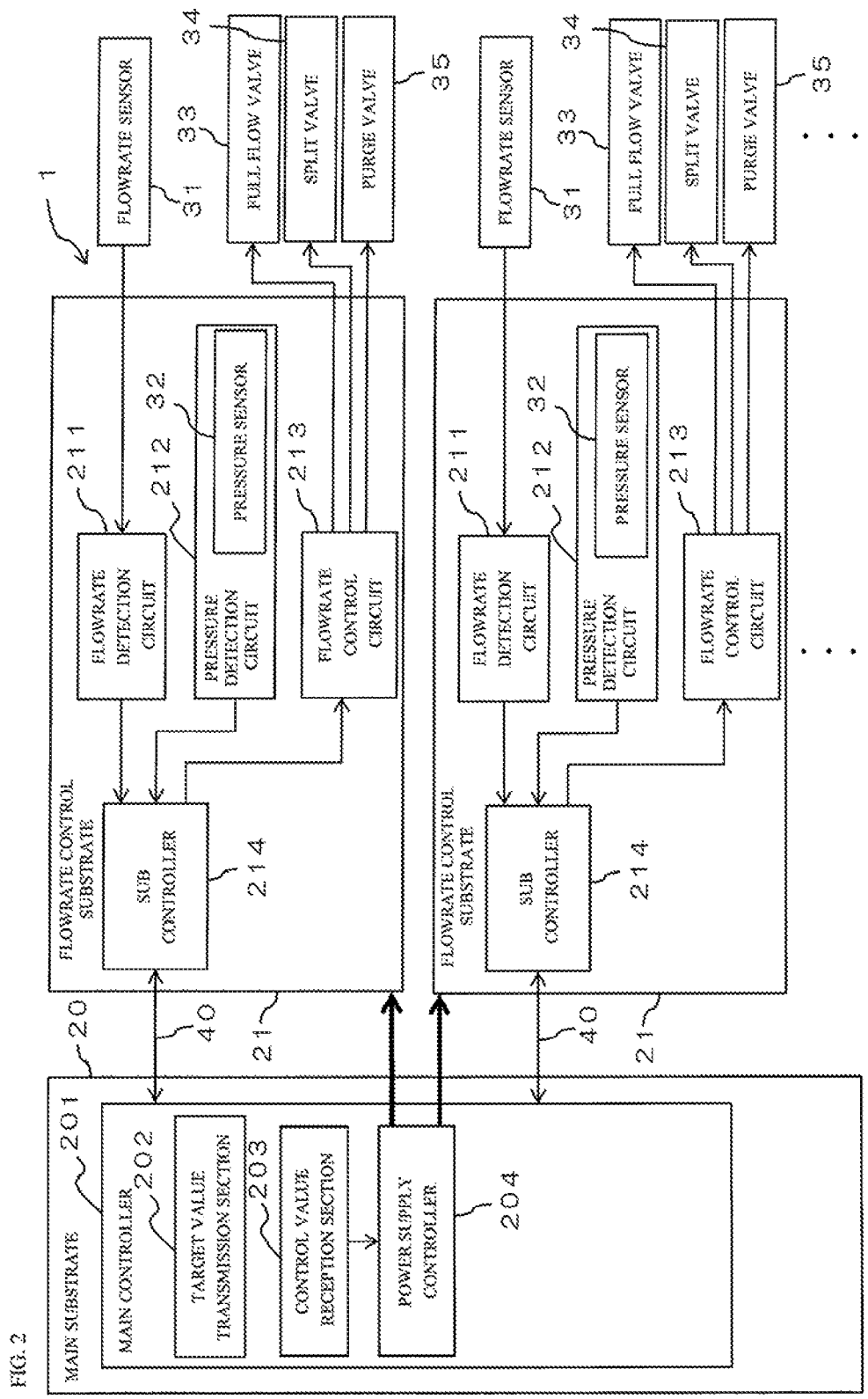
FIG. 2 is a block diagram illustrating an electrical configuration of a main substrate, flowrate control substrates, and their peripheral members in the gas chromatograph in FIG. 1.

2. Electrical Configuration of Main Substrate, Flowrate Control Substrates, and Peripheral Members FIG. 2 is a block diagram illustrating an electrical configuration of a main substrate 20, flowrate control substrates 21, and peripheral members of these in the gas chromatograph 1.

The gas chromatograph 1 includes the main substrate 20 and a plurality of the flowrate control substrates 21. The gas chromatograph 1 includes a plurality of flowrate sensors 31, pressure sensors 32, full flow valves 33, split valves 34, and purge valves 35 corresponding to the respective flowrate control substrates 21.

The flowrate sensors 31, the pressure sensors 32, and the full flow valves 33 are provided to the respective gas supply flow paths of the gas chromatograph 1. The split valves 34 are provided to the respective split flow paths of the gas chromatograph 1. The purge valves 35 are provided to the respective purge flow paths of the gas chromatograph 1.

For example, the flowrate control substrates 21 are advanced flow controller (AFC) substrates. The flowrate control substrates 21 each include a flowrate detection circuit 211, a pressure detection circuit 212, a flowrate control circuit 213, and a sub controller 214.

The flowrate detection circuit 211 detects the flowrate of the carrier gas flowing in the gas chromatograph 1, based on the detection result obtained by the flowrate sensor 31.

The pressure detection circuit 212 detects the pressure of the carrier gas flowing in the gas chromatograph 1 based on the detection result obtained by the pressure sensor 32. The pressure sensor 32 is mounted on the pressure detection circuit 212. The flowrate detection circuit 211 and the pressure detection circuit 212 are examples of detection circuits.

The flowrate control circuit 213 controls an operation of each of the full flow valve 33, the split valve 34, and the purge valve 35 based on a control signal from the sub controller 214, to control the flowrate of the carrier gas. For example, the sub controller 214 supplies a pulse width modulation (PWM) signal as a control signal to the flowrate control circuit 213. The flowrate control circuit 213 controls the flowrate of the carrier gas at a duty ratio based on the PWM signal.

For example, the sub controller 214 is a component including a central processing unit (CPU).

The main substrate 20 includes a main controller 201.

The main controller 201 is a component including a CPU. The main controller 201 performs serial communications with the sub controller 214 through a signal line 40. The CPU executes a program so that the main controller 201 functions as a target value transmission section 202, a control value reception section 203, a power supply controller 204, and the like, for example.

The target value transmission section 202 transmits a control target value, for controlling the flowrate of the carrier gas, to the sub controller 214 of each of the flowrate control substrates 21, through the serial communications. For example, the control target value is a set value of the flowrate of the carrier gas.

The control value reception section 203 receives control values transmitted from the sub controllers 214. The control value may be a value (for example, a duty ratio) related to a control signal to the flowrate control circuit 213, or may be a set value output from the flowrate sensor 31 or the pressure sensor 32 as a result of the control by the flowrate control circuit 213.

The power supply controller 204 controls power supply to the plurality of flowrate control substrates 21. Specifically, the power supply controller 204 performs control to stop the power supply to a certain flowrate control substrate 21 based on a signal from the sub controller 214 received by the control value reception section 203.

Figure 3:
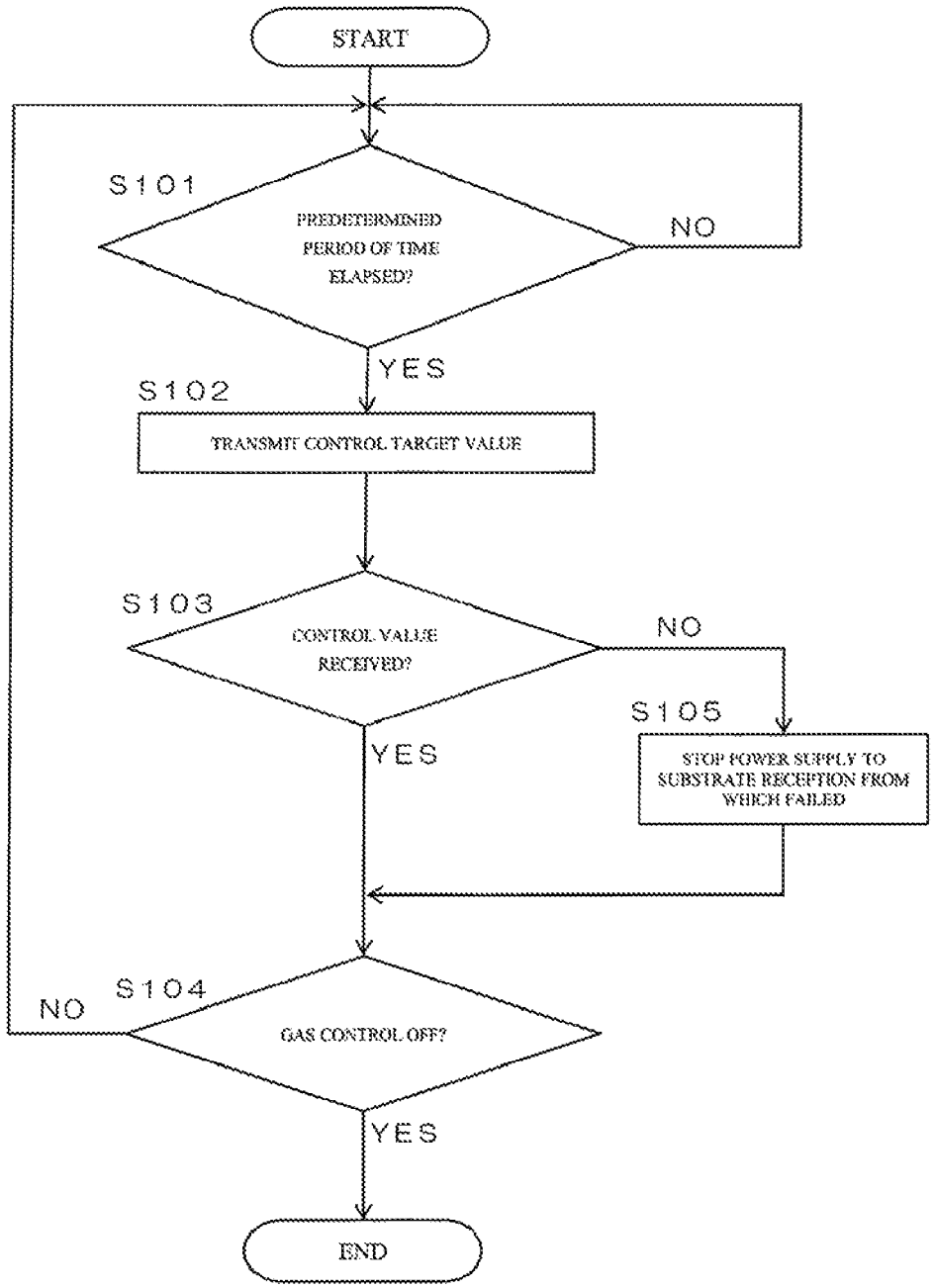
FIG. 3 is a flowchart illustrating a control operation performed by a main controller.

3. Control Operation Performed by Each Controller (1) Control Operation Performed by Main Controller FIG. 3 is a flowchart illustrating a control operation performed by the main controller 201.

In the gas chromatograph 1, when the control on the carrier gas starts, the main controller 201 of the main substrate 20 transmits the control target value, for controlling the flowrate of the carrier gas, to the sub controller 214 of each flowrate control substrate 21, through the serial communications. Specifically, when a predetermined period of time elapses (YES in step S101), the target value transmission section 202 transmits the control target value to the sub controller 214 of a predetermined flowrate control substrate 21 out of the plurality of flowrate control substrates 21, through the serial communications (step S102).

The control target value may be stored in advance in an unillustrated storage section, or may be set by a user.

As will be described in detail later, when the flowrate of the carrier gas is controlled by the flowrate control substrate 21 to which the control target value has been transmitted, the sub controller 214 of the flowrate control substrate 21 transmits an actual control value to the main controller 201 (control value reception section 203). Here, if the flowrate control substrate 21 is normally operating (if the flowrate control substrate 21 has no failure), the control value reception section 203 receives the control value from the sub controller 214 of this flowrate control substrate 21 (YES in step S103).

Then, when a predetermined period of time elapses, the control operation described above is performed on the sub controller 214 of the next flowrate control substrate 21. Specifically, when the predetermined period of time further elapses (YES in step S101) in a state where the control on the carrier gas is ongoing in the gas chromatograph 1 (NO in step S104), the target value transmission section 202 transmits the control target value to the sub controller 214 of the next flowrate control substrate 21 through the serial communications (step S102). Thereafter, when the flowrate of the carrier gas is controlled in the flowrate control substrate 21 to which the control target value has been transmitted, the sub controller 214 of the flowrate control substrate 21 transmits the actual control value to the control value reception section 203 (YES in step S103), as described above.

In this manner, the target value transmission section 202 transmits the control target value sequentially to the sub controllers 214 through the serial communications at a predetermined interval.

When the flowrate control substrate 21 has failure, the control value is not transmitted from the sub controller 214 of such a flowrate control substrate 21. Thus, even when the target value transmission section 202 transmits the control target value, the control value reception section 203 does not receive the control value from the sub controller 214 of such a flowrate control substrate 21 (NO in step S103).

In this case, the power supply controller 204 stops the power supply to the flowrate control substrate 21 the control value from which has been failed to be received by the control value reception section 203 (step S105).

Thereafter, the operations in steps S101 to 104 described above are repeated. Specifically, the target value transmission section 202 transmits the control target value sequentially to the sub controllers 214 through the serial communications at a predetermined interval. When the control on the carrier gas is completed in the gas chromatograph 1 (YES in step S104), the control operation performed by the main controller 201 is terminated.

(2) Control Operation Performed by Sub Controller

Figure 4:
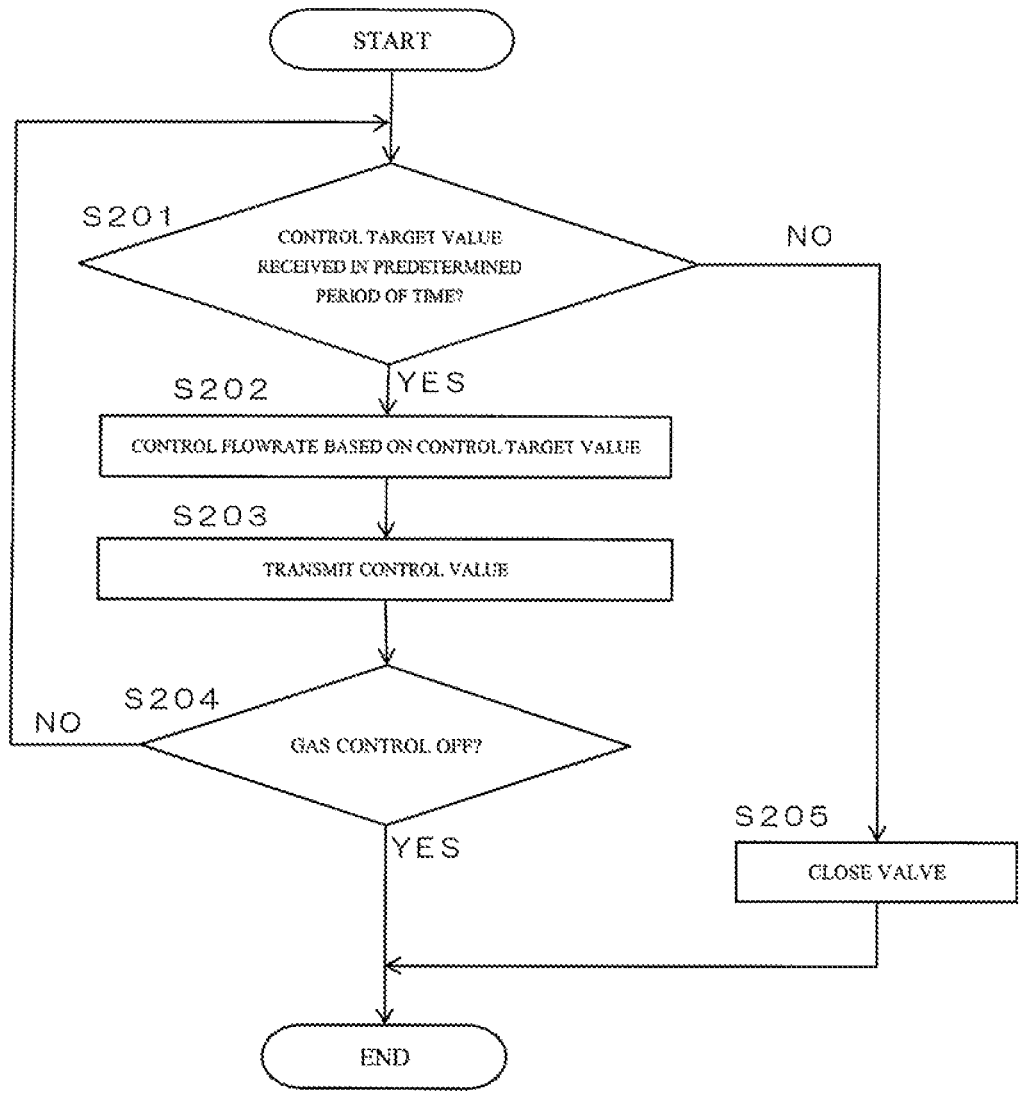
FIG. 4 is a flowchart illustrating a control operation performed by a sub controller.
Figure 5:
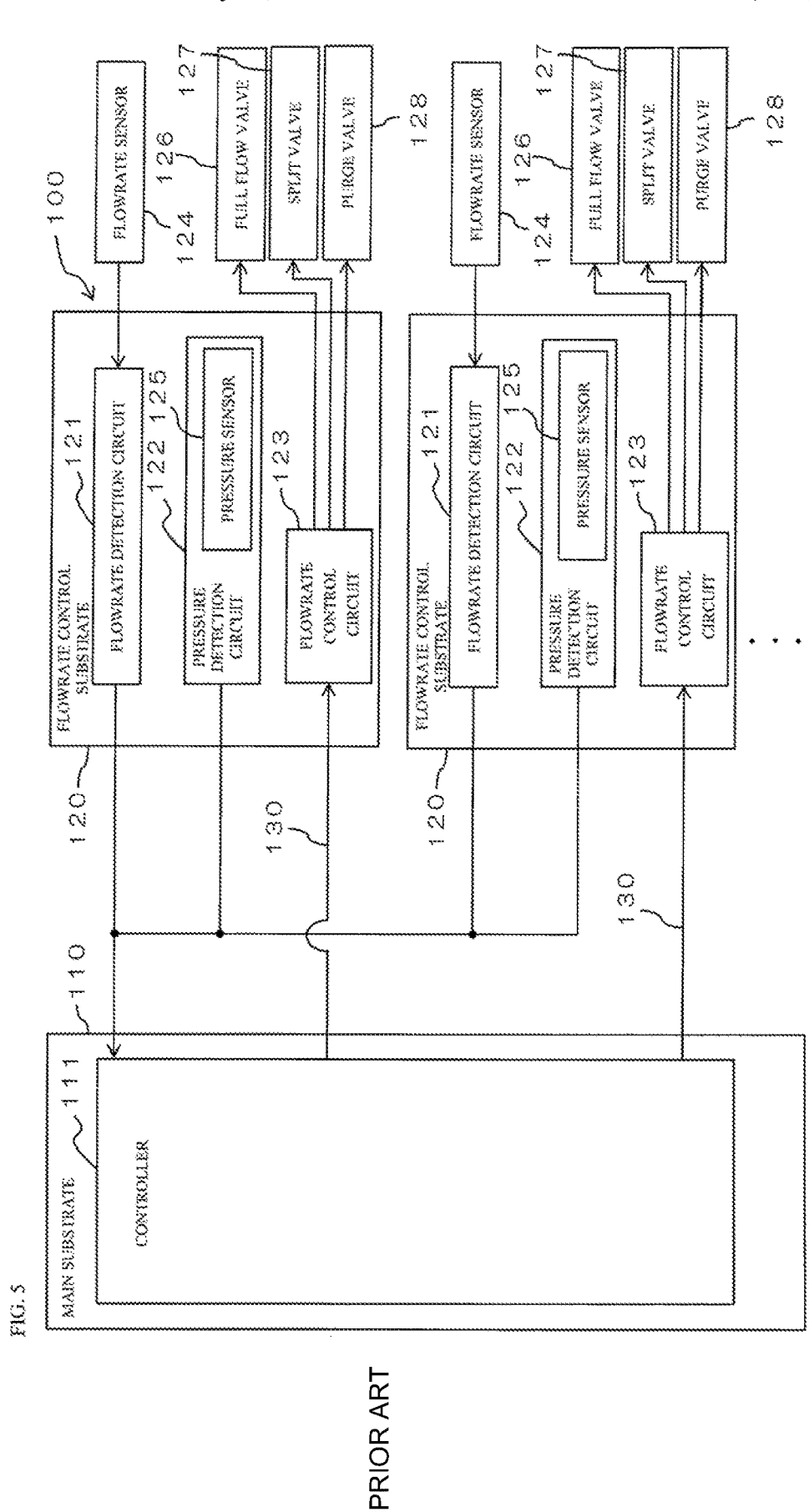
FIG. 5 is a block diagram illustrating an electrical configuration of a main substrate, flowrate control substrates, and their peripheral members in a conventional gas chromatograph.

FIG. 4 is a flowchart illustrating a control operation performed by the sub controller 214.

In each of the flowrate control substrates 21 in the gas chromatograph 1, the sub controller 214 performs the following control.

When receiving the control target value from the main controller 201 before the predetermined time period elapses (YES in step S201), the sub controller 214 causes the flowrate control circuit 213 to control the operations of the valves (the full flow valve 33, the split valve 34, and the purge valve 35), based on the detection signals from the flowrate detection circuit 211 and the pressure detection circuit 212. Specifically, the sub controller 214 adjusts the positions of the valves so that the flowrate of the carrier gas matches the control target value received from the main controller 201 (step S202).

Then, the sub controller 214 transmits the actual control value in the flowrate control circuit 213 to the main controller 201 (step S203).

In the gas chromatograph 1, as long as the control on the carrier gas is ongoing (NO in step S204), the operations in steps S201 to S204 described above are repeated. When the control on the carrier gas is completed in the gas chromatograph 1 (YES in step S204), the control operation performed by the sub controller 214 is terminated.

When the main substrate 20 has failure during such a control operation, no control target value is transmitted from the main substrate 20. Thus, the sub controller 214 receives no control target value from the main controller 201 before the predetermined period of time elapses (NO in step S201).

In this case, the sub controller 214 causes the flowrate control circuit 213 to put the valves (the full flow valve 33, the split valve 34, and the purge valve 35) in a closed state. Thus, the carrier gas stops flowing. Then, the control operation performed by the sub controller 214 is terminated.

4. Operation and Effect (1) In the present embodiment, as illustrated in FIG. 2, the main controller 201 of the main substrate 20 performs serial communications with the sub controller 214 of each of the flowrate control substrates 21. The flowrate of the carrier gas is controlled with the flowrate control circuit 213 under the control performed by each sub controller 214.

Thus, the main controller 201 only needs to execute the processing of performing the serial communications with each sub controller 214. Thus, the processing executed by the main controller 201 can be reduced.

As a result, the processing executed by the main controller 201 is less likely to overwhelm its processing capability even when the number of flowrate control substrates 21 is increased. Thus, a larger number of flowrate control substrates 21 can be installed in the gas chromatograph 1.

The main controller 201 and each sub controller 214 perform the serial communications, whereby the signal line 40 between the main controller 201 and each sub controller 214 can be made long.

Thus, the distance between the main substrate 20 and each of the flowrate control substrates 21 can be made long.

(2) In the present embodiment, the main controller 201 transmits the control target value, for the flowrate control circuit 213 to control the flowrate of the carrier gas, to each sub controller 214, through the serial communications.

Thus, the main controller 201 only needs to execute simple processing of transmitting the control target value to each sub controller 214 through the serial communications.

(3) In the present embodiment, as illustrated in FIG. 3, the main controller 201 transmits the control target value sequentially to the sub controllers 214 through the serial communications at a predetermined interval.

Thus, the main controller 201 can smoothly transmit the control target value to the sub controllers 214. Furthermore, the control interval in each sub controller 214 can be made short.

(4) In the present embodiment, as illustrated in FIG. 4, when the control target value fails to be received from the main controller 201 (NO in step S201), the sub controller 214 causes the flowrate control circuit 213 to put the valves (the full flow valve 33, the split valve 34, and the purge valve 35) in the closed state, to stop the flow of the carrier gas.

Thus, the carrier gas can be prevented from flowing when the main substrate 20 has failure.

(5) In the present embodiment, as illustrated in FIG. 2, the main controller 201 includes the power supply controller 204. The power supply controller 204 controls power supply to each of the plurality of flowrate control substrates 21.

Thus, with the power supply controller 204 performing control to stop the power supply to each flowrate control substrate 21, the carrier gas can be certainly stopped.

(6) In the present embodiment, the power supply controller 204 stops the power supply to the flowrate control substrate 21, out of the plurality of flowrate control substrates 21, the control value from which has been failed to be received by the control value reception section 203.

Thus, the power supply controller 204 can certainly stop the power supply to the flowrate control substrate 21 that has failure.

5. Modifications

In the description on the above embodiment, the sub controller 214 causes the flowrate control circuit 213 to control the operation of each valve, based on the detection signals from the flowrate detection circuit 211 and the pressure detection circuit 212. Alternatively, the sub controller 214 can cause the flowrate control circuit 213 to control the operations of the valves based on detection signals from at least one of the flowrate detection circuit 211 and the pressure detection circuit 212.

The flowrate control substrate 21, which is an AFC substrate in the description on the above embodiment, may be any substrate for controlling the flowrate of the carrier gas. For example, the flowrate control substrate 21 may be other substrates such as an auto pressure controller (APC), a dual AFC, and the like.

DESCRIPTION OF REFERENCE SIGNS 1 gas chromatograph
20 main substrate
21 flowrate control substrate
201 main controller 202 target value transmission section
203 control value reception section
204 power supply controller
211 flowrate detection circuit
212 pressure detection circuit
213 flowrate control circuit
214 sub controller

The invention claimed is:

1. A gas chromatograph comprising:
   a plurality of detectors that detect a sample component;
   a main substrate; and
   a plurality of flowrate control substrates that are connected to the main substrate and control a flowrate of carrier gas introduced into the plurality of detectors, wherein
   the flowrate of the carrier gas controlled by each of the plurality of flowrate control substrates is different among the plurality of detectors,
   the main substrate includes a main controller, and
   the plurality of flowrate control substrates each include a sub controller that performs serial communications with the main controller, a detection circuit that detects at least a pressure or a flowrate of carrier gas and sends a detection signal to the sub controller, and a flowrate control circuit, wherein the sub controller causes the flowrate control circuit to control the flowrate of the carrier gas based on the detection signal from the detection circuit.

2. The gas chromatograph according to claim 1, wherein the main controller transmits a control target value, for the flowrate control circuits to control the flowrate of the carrier gas, to the sub controllers, through the serial communications.

3. The gas chromatograph according to claim 2, wherein the main controller transmits the control target value sequentially to the sub controllers of the plurality of flowrate control substrates through the serial communications at a predetermined interval.

4. The gas chromatograph according to claim 2, wherein the sub controller causes the flowrate control circuit to stop the carrier gas upon failing to receive the control target value.

5. The gas chromatograph according to claim 1, wherein the main controller includes a power supply controller that controls power supply to each of the plurality of flowrate control substrates.

6. The gas chromatograph according to claim 5, wherein
   the main controller includes a control value reception section that receives a control value from each of the sub controllers of the plurality of flowrate control substrates, and
   the power supply controller stops the power supply to any of the plurality of flowrate control substrates, the control value from which has been failed to be received by the control value reception section.

* * * * *